Sept. 14, 1926.

F. T. HUGHES 1,599,767

EXTENSION ATTACHMENT FOR BRAKE LEVERS

Filed Feb. 17, 1926

INVENTOR.
Frederick T. Hughes
BY
ATTORNEYS.

Patented Sept. 14, 1926.

1,599,767

UNITED STATES PATENT OFFICE.

FREDERICK T. HUGHES, OF LOS ANGELES, CALIFORNIA.

EXTENSION ATTACHMENT FOR BRAKE LEVERS.

Application filed February 17, 1926. Serial No. 88,822.

This invention relates to an attachment for the brake lever of an automobile. These levers are sometimes located in such a way that they are not reached with great convenience by the driver of the car. The lever to which my improvement is intended to be applied is located in a substantially vertical plane and is operated by swinging it in a front and rear direction. The lever is provided with a releasing lever which is spring-actuated to hold the brakes applied but must be pressed when the brake lever is to be released.

The general object of this invention is to provide an attachment for such a lever which will provide an extension handle or bar extending rearwardly from the lever and also includes an auxiliary releasing lever which engages with the regular releasing lever so as to enable it to be operated. The extension handle or bar and the auxiliary releasing lever are attached in such a way that they extend substantially transversely to the direction in which the handle of the brake lever and the regular releasing lever extend, that is to say, the extension handle and the auxiliary releasing lever extend in a substantially horizontal direction; one of objects of the invention is to provide a very simple construction which will enable the extension handle to be readily attached in position with the auxiliary releasing lever connected with the regular releasing lever, and also to construct the attachment in such a way that the pivotal axis of the auxiliary releasing lever substantially coincides with the pivotal axis of the regular or main releasing lever.

Further objects of the invention will appear hereinafter.

The invention consists in the novel parts and combination of parts to be described hereinafter, all of which contribute to produce an efficient extension attachment for brake levers.

A preferred embodiment of the invention is described in the following specification, while the broad scope of the invention is pointed out in the appended claims.

In the drawing:—

Figure 1:
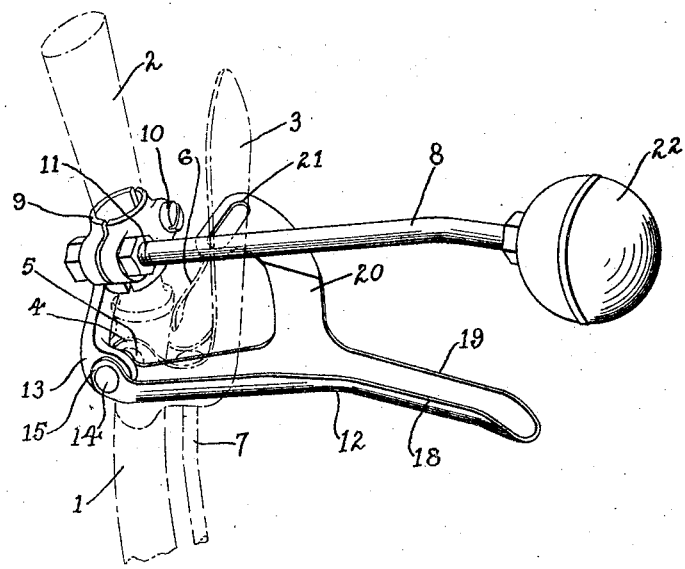
Figure 1 is a perspective illustrating the brake lever and its releasing lever in dotted lines, and illustrating my attachment in full lines secured in place on the brake lever.

As illustrated in dotted lines, 1 represents the brake lever of the automobile, the upper end of which terminates in the usual handle 2. On the upper end of the brake lever near the root of the handle a releasing lever 3 is pivotally attached, the said releasing lever having its lower end bifurcated so that a pair of ears 4 are provided, which are pivotally attached to the lever 1 by a through-bolt or rivet located at the point 5.

The forward side of the releasing lever 3, which I call the main releasing lever, is provided with a leaf spring 6, the end of which rests against the adjacent face of the brake lever so as to hold the releasing lever 3 at the limit of its movement away from the handle 2. The lower end of the releasing lever 3 is attached to a small pull rod or link 7 which extends downwardly to the latch or dog which is not illustrated but which latches the brake lever (with the brakes applied) to the brake segment.

In applying my invention, I provide an extension handle, preferably in the form of a bar 8, and this extension handle is provided with attaching means such as a clamp 9 in the form of a split collar which may be attached to the handle 2 by a short bolt 10 and a threaded extension 11, which constitutes the forward end of the extension handle or bar 8.

Figure 2:
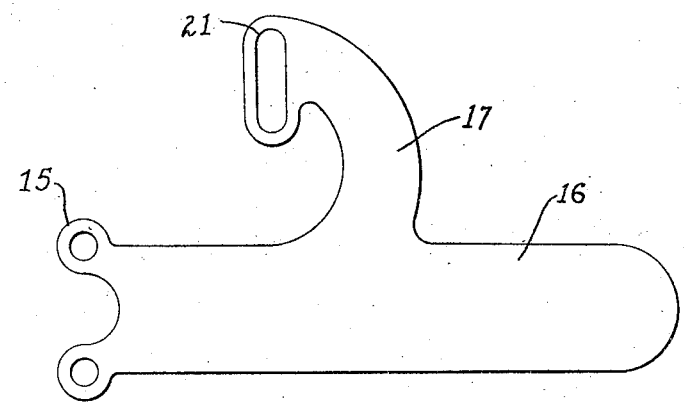
Figure 2 is a plan of the blank from which my auxiliary releasing lever may be readily produced as a stamping.

On this attachment 9 I mount pivotally my auxiliary releasing lever 12. In order to accomplish this and to place the pivot for the lever 12 so that its axis substantially coincides with the point 5, that is to say, with the axis of the pivot of the lever 3, I provide the clamp 9 with a downward extension or arm 13 which extends around to one side of the lever 1. In securing my attachment in place I remove the usual pivot bolt or rivet at the point 5 and substitute a long pivot bolt or rivet 14 which passes through the extension 13 and secures the lever 12 in place, in addition to securing the lever 3 in place. The lever 12 is preferably constructed at its forward end with two upturned ears 15, which lie on opposite sides of the lower end of the extension or arm 13 to which the lever is attached. The lever 12 is preferably formed as a stamping from a plate or blank 16 having the general characteristics illustrated in Fig. 2. This blank has an upwardly extending portion 17. In forming the lever, the body of the blank 16 is stamped so as to give it a channel form and so that it presents two upwardly extending flanges 18 and 19, from the latter of which the portion 17 extends upwardly; this portion of the blank is then bent into the form of a tongue 20 which constitutes an integral extension of the flange 19. The upper end of this tongue is provided with suitable socket means to engage the lever 3. I prefer to bend the upper end of the tongue 20 so that it projects forwardly and slightly inclined to the horizontal plane, the forward end of the tongue being provided with a socket means to engage the main lever 3; this may consist of a slit 21 which can be slid over the end of the lever 3 when the attachment is being secured in place.

If desired, the end of the extension handle 8 may terminate in a knob 22.

If a brake lever has been provided with my attachment, evidently it can be operated simply by seizing the extension handle 8 and the lever 12; by pressing the lever 12 upwardly toward the extension handle 8, it will be evident that the end of the tongue 20 will rotate the lever 3 about its pivotal axis. The regular spring 6 of the main releasing lever 3 operates, of course, to return the lever 12 to its extreme depressed position when it returns the main releasing lever 3 to its extreme rearward position.

What I claim is:—

1. An extension attachment for an automobile brake lever having a handle and a releasing lever, consisting of the combination of an extension handle with attaching means for securing the same rigidly to the handle of the brake lever with the extension handle projecting in a substantially transverse direction with respect to the handle of the brake lever, and an auxiliary releasing lever pivotally supported on the said attaching means, extending in a substantially transverse direction with respect to the handle of the first named releasing lever, said auxiliary releasing lever having means for engaging the first named releasing lever to operate the same.

2. An extension attachment for an automobile brake lever having a handle and a pivoted main releasing lever, consisting of the combination of an extension bar with attaching means for securing the same rigidly to the handle of the lever with the extension bar projecting in a substantially transverse direction with respect to the handle of the lever, and an auxiliary releasing lever pivotally connected with the attaching means on the pivot pin of the main releasing lever, extending in a substantially transverse direction, said auxiliary releasing lever having means for engaging the main releasing lever.

3. An extension attachment for an automobile brake lever having a handle and a main releasing lever, consisting of the combination of an extension handle with a clamp for securing the same to the handle of the brake lever, with the extension handle projecting in a substantially transverse direction with respect to the handle of the brake lever, and an auxiliary releasing lever pivotally supported on the said clamp, extending in a substantially transverse direction with respect to the handle of the main releasing lever, said auxiliary releasing lever having an upwardly extending tongue with socket means for engaging the main releasing lever to operate the same.

4. An extension attachment for an automobile brake lever having a handle and main releasing lever, consisting of the combination of an extension bar with a clamp for attaching the same rigidly to the handle of the brake lever, with the extension bar projecting in a substantially transverse direction with respect to the handle of the brake lever, said clamp having a downward extension extending to a point substantially in line with the pivotal axis of the releasing lever, and an auxiliary releasing lever pivotally supported on the said downward extension on a pivotal axis substantially coinciding with the pivotal axis of the main releasing lever, said auxiliary releasing lever having an upwardly projecting tongue with socket means for engaging the first named releasing lever to operate the same.

5. An extension attachment for an automobile brake lever having a handle and a releasing lever, consisting of the combination of an extension handle with attaching means for securing the same rigidly to the handle of the brake lever with the extension handle projecting in a substantially transverse direction with respect to the handle of the brake lever, and an auxiliary releasing lever pivotally supported on the said attaching means, extending in a substantially transverse direction with respect to the handle of the first named releasing lever, said auxiliary releasing lever having a channel shaped body with upwardly projecting side flanges, one of said flanges having an integral upward extension with socket means for engaging the first named releasing lever to operate the same.

Signed at Los Angeles, California, this 11th day of February, 1926.

FREDERICK T. HUGHES.